3,298,919
SHAVING CREAM CONTAINING
        POLYSILOXANES
Jack L. Bishop, Jr., and Charles W. Todd, Midland,
  Mich., assignors to Dow Corning Corporation, Midland, Mich., a corporation of Michigan
No Drawing. Filed Dec. 26, 1962, Ser. No. 247,337
          10 Claims. (Cl. 167—85)

The addition of silicone fluids to pre-electric shave and aftershave lotions is well known. The addition of silicone fluids to pre-electric shave lotions is particularly desirable since the silicone fluids lubricate the skin and eliminate razor burns thus resulting in a superior shave. The silicone fluids also tend to make the face and neck feel good and help to keep perspiration and water-borne irritants from causing or aggravating annoying rashes.

Attempts have been made to incorporate silicone fluids in shaving creams but such attempts have been without success since the silicone fluids defoam the shaving lather as might well be expected since silicones are notorious as antifoaming agents.

It has now been discovered by applicant that certain silicone fluids can be incorporated into shaving creams if properly formulated.

The addition of the silicone fluids to the shaving cream gives increased lubricity and reshavability to the formulation.

This invention relates to a shaving cream comprising about 0.5 to 9 percent stearic acid, about 0.5 to 3 percent lauric acid, about 1 to 15 percent glycerine, about 1 to 7 percent triethanolamine, about 40 to 80 percent water, about 2 to 12 percent of a propellant and about 0.1 to 5 percent of a silicone fluid, said percents being on a weight basis.

Silicone fluids that can be used in accordance with this invention are, for example, those having the general formula $$\text{CH}_3\overset{\text{O}}{\underset{\|}{\text{C}}}(\text{OC}_2\text{H}_4)_n\text{OC}_3\text{H}_6\overset{\text{CH}_3}{\underset{|}{\text{Si}}}\text{O}$$

wherein $n$ has an average value of from 3 to 4 inclusive, polydimethylsiloxane fluids having the general formula $$(\text{CH}_3)_3\text{Si}(\text{O}\overset{(\text{CH}_3)_2}{\underset{|}{\text{Si}}})_x\text{OSi}(\text{CH}_3)_3,$$

wherein $x$ has an average value of from 0 to 160 inclusive and having a viscosity in the range of 0.65 to 500 cs. at 25° C., copolymers consisting essentially of phenylmethyl and dimethylsiloxane units, hydroxylated polydimethylsiloxane fluids and preferably those hydroxylated polydimethylsiloxane fluids having a viscosity in the range of 30 to 50 cs. at 25° C. and containing 3.5 to 4.5 percent by weight silicon-bonded hydroxyl groups and siloxanes having the general formulas

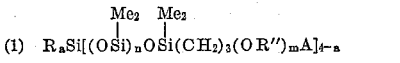

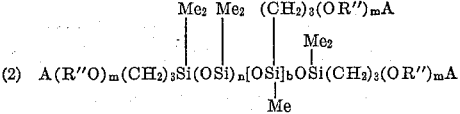

or

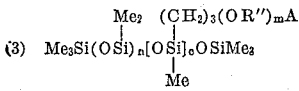

wherein R is a hydrocarbon radical free of aliphatic unsaturation and contains from 1 to 10 inclusive carbon atoms, Me is a methyl radical, $n$ has an average value of from 6 to 30, R″ is an alkylene radical containing from 2 to 4 inclusive carbon atoms, $m$ has an average value of from 25 to 80, A is selected from the group consisting of

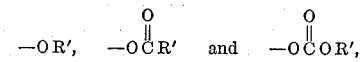

R′ is selected from the group consisting of hydrocarbon and hydrocarbonoxy radicals free of aliphatic unsaturation and containing from 1 to 10 inclusive carbon atoms, $a$ has an average value of from 0 to 2 inclusive, $b$ has an average value of from 1 to 2 inclusive and $c$ has an average value of from 3 to 4 inclusive, said siloxane containing at least 13 percent by weight of Me$_2$SiO units based on the weight of the siloxane In the hydroxylated polydimethylsiloxane fluids, the hydroxy groups are predominantly found on the end of the chain, although some can be present along the chain.

The amount of the silicone fluid employed can be varied over a wide range. Amounts ranging from 0.1 to 5 percent by weight can be used. It is preferred that about 0.5 to 2 percent be employed.

When the shaving cream is an aerosol formulation, any suitable propellant can be employed. Examples of suitable propellants are trichloromonofluoromethane, dichlorodifluoromethane, monochlorotrifluoromethane, carbon tetrafluoride, dichloromonofluoromethane, monochlorodifluoromethane, monobromotrifluoromethane, dibromodifluoromethane, trifluoromethane, tetrachlorodifluoroethane, trichlorotrifluoroethane, dichlorotetrafluoroethane, dibromomonochlorotrifluoroethane, dibromotetrafluoroethane, monochloropentafluoroethane, ethylidene fluoride, 1,1,1-difluorochloroethane and mixtures thereof. These materials are well known articles of commerce, the last two being sold under the trademark "Genetron" and the remainder being sold under the trademark "Freon."

The following examples are for purposes of illustration only and should not be construed as limiting to the invention.

The formulation of Example 1 is the preferred embodiment of this invention. It is useful per se as a shaving cream but more important it can be used as a base formulation with which other well known ingredients of shaving creams can be blended or formulated.

All percents and parts referred to herein are on a weight basis unless otherwise specified.

Example 1

A shaving cream was prepared by mixing 4.05 percent stearic acid, 1.35 percent lauric acid, 9.00 percent glycerine, 3.24 percent triethanolamine, 71.36 percent water, 10.00 percent dichlorodifluoromethane and 1.00 percent of a siloxane fluid having the general formula

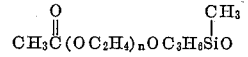

wherein $n$ has an average value of from 3 to 4.

Samples of the above formulation and an identical formulation except that it contained no silicone fluid were submitted to a panel of people for personal evaluation and comparison. The panel members were asked to rate the samples on characteristics such as razor drag, reshavability, lubricity, comfort of the shave, feel of the skin, quality and quantity of the foam, etc. On the average, the formulation containing the silicone fluids was rated superior in every category and the addition of the silicone fluid resulted in no loss of foam quality or quantity.

While Example 1 sets forth the preferred embodiment of this invention, the amounts of the various ingredients employed therein can be varied within the following ranges:

| | Percent |
|---|---|
| Stearic acid | 0.5–9 |
| Lauric acid | 0.5–3 |
| Glycerine | 1–15 |
| Silicone fluid | 0.1–5 |
| Triethanolamine | 1–7 |
| Water | 40–80 |
| Propellant | 2–12 |

The following ingredients are illustrative of the other ingredients which can be blended with the shaving cream formulations of this invention:

| | Percent |
|---|---|
| Coconut fatty acids | 0–15 |
| Glyceryl monostearate | 0–10 |
| Myristic acid | 0–5 |
| Sodium lauryl sulfate | 0–7 |
| Stearyl alcohol | 0–5 |
| Mineral oil | 0–10 |
| Sorbo (a 70% water solution of sorbitol) | 0–15 |
| Cetyl alcohol | 0–5 |
| Petrolatum | 0–15 |
| Sorbitan monostearate | 0–6 |
| Polyoxyethylene sorbitan monostearate | 0–5 |
| Triethanolamine lauryl sulfate | 0–10 |
| Lanolin | 0–5 |
| Potassium hydroxide | 0–5 |
| Perfume | 0–0.5 |

*Example 2*

A shaving cream was prepared by mixing 4.05 percent stearic acid, 1.35 percent lauric acid, 9.00 percent glycerine, 3.24 percent triethanolamine, 67.36 percent water, 10.00 percent dichlorodifluoromethane and 5.00 percent of a siloxane fluid having the general formula

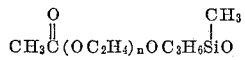

wherein $n$ has an average value of from 3 to 4.

This formulation performed as well as that of Example 1 and in addition had greater lubricity.

*Example 3*

Below is a list of other silicone fluid that were substituted for the silicone fluid of Example 1 in a like amount. All of the fluids gave a superior formulation as compared to the formulation without a silicone fluid and caused substantially no loss in foam quality or quantity.

(a) Hexamethyldisiloxane fluid having a viscosity of 0.65 cs. at 25° C.

(b) A polydimethylsiloxane fluid having a viscosity of 100 cs. at 25° C. of the formula

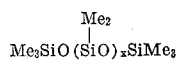

(c) An absolute ethanol soluble polydimethylsiloxane fluid having a viscosity of 7–12 cs. at 25° C.

(d) A silicone fluid consisting essentially of phenylmethyl and dimethylsiloxane units.

(e) A hydroxylated polydimethylsiloxane fluid having a viscosity of 30–50 cs. at 25° C. and containing 3.5 to 4.5 percent by weight hydroxyl groups.

(f) a siloxane fluid having the general formula

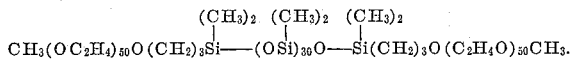

*Example 4*

When the following ingredients are mixed a good shaving cream is obtained: 6.2 percent stearic acid, 1.73 percent lauric acid, 7.0 percent glycerine, 0.2 percent of the silicone fluid of Example 1, 2.8 percent triethanolamine, 0.75 percent lanolin, 2.1 percent sorbitan monostearate, 0.35 percent potassium hydroxide, 4.0 percent petrolatum, 69.8 percent water and 8.2 percent of a mixture of dichlorodifluoromethane and dichloromonofluoromethane.

*Example 5*

When the following ingredients are mixed a good shaving cream is obtained: 6.2 percent stearic acid, 1.73 percent lauric acid, 10.2 percent glycerine, 3.1 percent of the silicone fluid of Example 1, 4.18 percent triethanolamine, 5.52 percent Sorbo, 2.13 percent cetyl alcohol, 3.0 percent sodium lauryl sulfate, 2.67 percent lanolin, 0.3 percent perfume, 49.72 percent water and 11.25 percent dibromodifluoromethane.

That which is claimed is:

1. A shaving cream comprising about 0.5 to 9 percent stearic acid, about 0.5 to 3 percent lauric acid, about 1 to 15 percent glycerine, about 1 to 7 percent triethanolamine, about 40 to 80 percent water, about 2 to 12 percent of a propellant and about 0.1 to 5 percent of a silicone fluid selected from the group consisting of (I) fluids having the formula

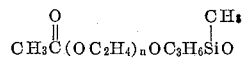

where $n$ has an average value of from 3 to 4, (II) polydimethylsiloxane fluids having the formula

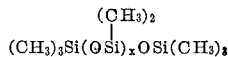

wherein $x$ has an average value of from 0 to 160 inclusive and having a viscosity in the range of 0.65 to 500 cs. at 25° C., (III) absolute ethanol soluble polydimethylsiloxane fluids having a viscosity in the range of 5 to 15 cs. at 25° C., (IV) copolymer fluids consisting essentially of phenylmethyl and dimethylsiloxane units, (V) hydroxylated polydimethylsiloxane fluids having a viscosity in the range of 3 to 10,000 cs. at 25° C. and containing about 0.1 to 5 percent by weight hydroxyl groups, and (VI) siloxane fluids selected from the group consisting of (1) siloxanes having the formula

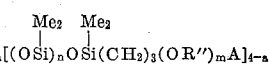

(2) siloxanes having the formula

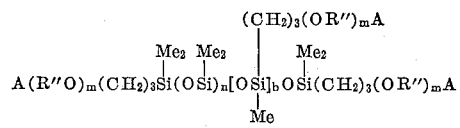

and (3) siloxanes having the formula

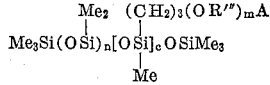

wherein R is hydrocarbon free of aliphatic unsaturation and contains from 1 to 10 inclusive carbon atoms, Me is methyl, $n$ has an average value of from 6 to 30, R″ is alkylene containing from 2 to 4 inclusive carbon atoms, $m$ has an average value of from 25 to 80, A is selected from the group consisting of —OR′,

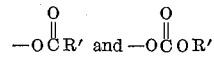

R′ is selected from the group consisting of hydrocarbon and hydrocarbonoxy free of aliphatic unsaturation and containing from 1 to 10 inclusive carbon atoms, $a$ has an average value of from 0 to 2 inclusive, $b$ has an average value of from 1 to 2 inclusive and $c$ has an average value of from 3 to 4 inclusive, said siloxane containing at least 13 percent by weight of Me$_2$SiO units based on the weight of the siloxane, said percents being on a weight basis.

2. The shaving cream of claim 1 wherein said silicone fluid has the formula

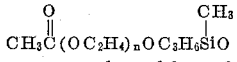

wherein $n$ has an average value of from 3 to 4.

3. The shaving cream of claim 1 wherein said silicone fluid is a polydimethylsiloxane fluid having the formula $$(CH_3)_3Si(OSi)_xOSi(CH_3)_3$$
$$|$$
$$(CH_3)_2$$

wherein $x$ has an average value of from 0 to 160 inclusive and having a viscosity in the range of 0.65 to 500 cs. at 25° C.

4. The shaving cream of claim 3 wherein said silicone fluid is an absolute ethanol soluble polydimethylsiloxane fluid having a viscosity in the range of 5 to 15 cs. at 25° C.

5. The shaving cream of claim 1 wherein said silicone fluid is a copolymer consisting essentially of phenylmethyl and dimethylsiloxane units.

6. The shaving cream of claim 1 wherein said silicone fluid is a hydroxylated polydimethylsiloxane fluid having a viscosity in the range of 3 to 10,000 cs. at 25° C. and containing about 0.1 to 5 percent by weight hydroxyl groups.

7. The shaving cream of claim 1 wherein said silicone fluid is a siloxane selected from the group consisting of (1) siloxanes having the formula $$R_a[(OSi)_nOSi(CH_2)_3(OR'')_mA]_{4-a}$$
$$\quad\ |\quad\ \ |$$
$$\ \ Me_2\ \ Me_2$$

(2) siloxanes having the formula $$A(R''O)_m(CH_2)_3Si(OSi)_n[OSi]_bOSi(CH_2)_3(OR'')_mA$$

with $Me_2$, $Me_2$, $(CH_2)_3(OR'')_mA$ / $Me_2$ / $Me$ substituents and (3) siloxanes having the formula $$Me_3Si(OSi)_n[OSi]_cOSiMe_3$$

with $Me_2$, $(CH_2)_3(OR'')_mA$ / $Me$ substituents wherein R is hydrocarbon free of aliphatic unsaturation and contains from 1 to 10 inclusive carbon atoms, Me is methyl, $n$ has an average value of from 6 to 30, R'' is alkylene containing from 2 to 4 inclusive carbon atoms, $m$ has an average value of from 25 to 80, A is selected from the group consisting of —OR', $$-O\overset{O}{\underset{\|}{C}}R' \text{ and } -O\overset{O}{\underset{\|}{C}}OR'$$

R' is selected from the group consisting of hydrocarbon and hydrocarbonoxy free of aliphatic unsaturation and containing from 1 to 10 inclusive carbon atoms, $a$ has an average value of from 0 to 2 inclusive, $b$ has an average value of from 1 to 2 inclusive and $c$ has an average value of from 3 to 4 inclusive, said siloxane containing at least 13 percent by weight of $Me_2SiO$ units based on the weight of the siloxane.

8. A shaving cream consisting essentially of 4.05 percent stearic acid, 1.35 percent lauric acid, 9.00 percent glycerine, 3.24 percent triethanolamine, 67.36 to 72.26 percent water, 10 percent of a propellant and 0.1 to 5 percent of a silicone fluid selected from the group consisting of (I) fluids having the formula $$CH_3\overset{O}{\underset{\|}{C}}(OC_2H_4)_nOC_3H_6\overset{CH_3}{\underset{|}{Si}}O$$

where $n$ has an average value of from 3 to 4, (II) polydimethylsiloxane fluids having the formula $$(CH_3)_3Si(OSi)_xOSi(CH_3)_3$$
$$|$$
$$(CH_3)_2$$

wherein $x$ has an average value of from 0 to 160 inclusive and having a viscosity in the range of 0.65 to 500 cs. at 25° C., (III) absolute ethanol soluble polydimethylsiloxane fluids having a viscosity in the range of 5 to 15 cs. at 25° C., (IV) copolymer fluids consisting essentially of phenylmethyl and dimethylsiloxane units, (V) hydroxylated polydimethylsiloxane fluids having a viscosity in the range of 3 to 10,000 cs. at 25° C. and containing about 0.1 to 5 percent by weight hydroxyl groups, and (VI) siloxane fluids selected from the group consisting of (1) siloxanes having the formula $$R_a[(OSi)_nOSi(CH_2)_3(OR'')_mA]_{4-a}$$
$$\quad\ |\quad\ \ |$$
$$\ \ Me_2\ \ Me_2$$

(2) siloxanes having the formula $$A(R''O)_m(CH_2)_3Si(OSi)_n[OSi]_bOSi(CH_2)_3(OR'')_mA$$

with $Me_2$, $Me_2$, $(CH_2)_3(OR'')_mA$ / $Me_2$ / $Me$ substituents and (3) siloxanes having the formula $$Me_3Si(OSi)_n[OSi]_cOSiMe_3$$

with $Me_2$, $(CH_2)_3(OR'')_mA$ / $Me$ substituents wherein R is hydrocarbon free of aliphatic unsaturation and contains from 1 to 10 inclusive carbon atoms, Me is methyl, $n$ has an average value of from 6 to 30, R'' is alkylene containing from 2 to 4 inclusive carbon atoms, $m$ has an average value of from 25 to 80, A is selected from the group consisting of —OR', $$-O\overset{O}{\underset{\|}{C}}R', \text{ and } -O\overset{O}{\underset{\|}{C}}OR'$$

R' is selected from the group consisting of hydrocarbon and hydrocarbonoxy free of aliphatic unsaturation and containing from 1 to 10 inclusive carbon atoms, $a$ has an average value of from 0 to 2 inclusive, $b$ has an average value of from 1 to 2 inclusive and $c$ has an average value of from 3 to 4 inclusive, said siloxane containing at least 13 percent by weight of $Me_2SiO$ units based on the weight of the siloxane, said percents being on a weight basis.

9. The shaving cream of claim 8 wherein said silicone fluid has the formula $$CH_3\overset{O}{\underset{\|}{C}}(OC_2H_4)_nOC_3H_6\overset{CH_3}{\underset{|}{Si}}O$$

wherein $n$ has an average value of from 3 to 4.

10. A method of shaving which comprises the steps of applying to the face a foam from a shaving cream comprising about 0.5 to 9 percent stearic acid, about 0.5 to 3 percent lauric acid, about 1 to 15 percent glycerine, about 1 to 7 percent triethanolamine, about 40 to 80 percent water, about 2 to 12 percent of a propellant and about 0.1 to 5 percent of a silicone fluid selected from the group consisting of (I) fluids having the formula $$CH_3\overset{O}{\underset{\|}{C}}(OC_2H_4)_nOC_3H_6\overset{CH_3}{\underset{|}{Si}}O$$

where $n$ has an average value of from 3 to 4, (II) polydimethylsiloxane fluids having the formula $$(CH_3)_3Si(CSi)_xCSi(CH_3)_3$$
$$|$$
$$(CH_3)_2$$

wherein $x$ has an average value of from 0 to 160 inclusive and having a viscosity in the range of 0.65 to 500 cs. at 25° C., (III) absolute ethanol soluble polydimethylsiloxane fluids having a viscosity in the range of 5 to 15 cs. at 25° C., (IV) copolymer fluids consisting essentially of phenylmethyl and dimethylsiloxane units, (V) hydroxylated polydimethylsiloxane fluids having a viscosity in the range of 3 to 10,000 cs. at 25° C. and containing about 0.1 to 5 percent by weight hydroxyl groups, and (VI) siloxane fluids selected from the group consisting of (1) siloxanes having the formula $$R_a[(OSi)_nOSi(CH_2)_3(OR'')_mA]_{4-a}$$
$$\quad\ |\quad\ \ |$$
$$\ \ Me_2\ \ Me_2$$

(2) siloxanes having the formula

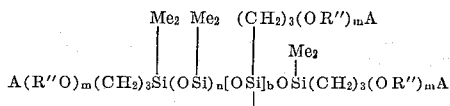

and (3) siloxanes having the formula

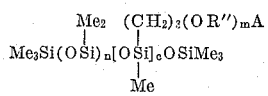

wherein R is hydrocarbon free of aliphatic unsaturation and contains from 1 to 10 inclusive carbon atoms, Me is methyl, $n$ has an average value of from 6 to 30, R'' is alkylene containing from 2 to 4 inclusive carbon atoms, $m$ has an average value of from 25 to 80, A is selected from the group consisting of —OR′,

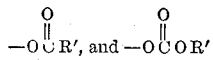

R′ is selected from the group consisting of hydrocarbon and hydrocarbonoxy free of aliphatic unsaturation and containing from 1 to 10 inclusive carbon atoms, $a$ has an average value of from 0 to 2 inclusive, $b$ has an average value of from 1 to 2 inclusive and $c$ has an average value of from 3 to 4 inclusive, said siloxane containing at least 13 percent by weight of $Me_2SiO$ units based on the weight of the siloxane, said percents being on a weight basis, and thereafter shaving with a razor.

References Cited by the Examiner

UNITED STATES PATENTS 2,655,480  10/1953  Spitzer _____ 167—39
2,826,551  3/1958   Geen _____ 167—87

OTHER REFERENCES

Campbell, Amer. Perfumes and Aromatics, vol. 69, 1–1957, p. 78.

J. Soc. of Cos Chem., vol. 7, pp. 349, 352, 7–1956.

Manuf. Chem., vol. 28, 12–1957, pp. 541–544.

Reilly, Soap & San. Chem., vol. 34, 2–1958, pp. 113–115, 119, 159.

Soap & Sanitary Chem., vol. 29, 9–1953, pp. 149, 153.

Tajkowski, Proc. Sci. Section of the Toilet Goods Assn. No. 20, 12–1953, pp. 1–7.

JULIAN S. LEVITT, *Primary Examiner.*

FRANK CACCIAPAGLIA, Jr., *Examiner.*

ANNA P. FAGELSON, *Assistant Examiner.*

UNITED STATES PATENT OFFICE
CERTIFICATE OF CORRECTION

Patent No. 3,298,919                           January 17, 1967

Jack L. Bishop, Jr., et al.

It is hereby certified that error appears in the above numbered patent requiring correction and that the said Letters Patent should read as corrected below.

Column 1, lines 45 and 46, after the formula, strike out "I"; column 3, line 45, for "fluid" read -- fluids --; line 72, for "6.2 percent stearic acid, 1.73" read -- 3.5 percent stearic acid, 1.3 --; column 4, lines 50 to 54., the formula should appear as shown below instead of as in the patent:

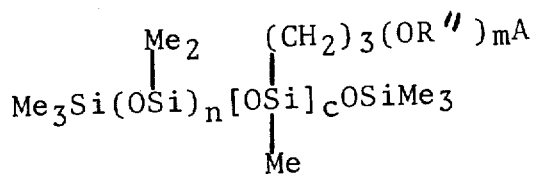

Signed and sealed this 24th day of October 1967.

(SEAL)
Attest:

EDWARD M. FLETCHER, JR.
Attesting Officer

EDWARD J. BRENNER
                                       Commissioner of Patents